US008842133B2

(12) United States Patent
Harper et al.

(10) Patent No.: US 8,842,133 B2
(45) Date of Patent: Sep. 23, 2014

(54) BUFFERS FOR DISPLAY ACCELERATION

(71) Applicant: Apple Inc., Cupertino, CA (US)

(72) Inventors: John Harper, San Francisco, CA (US);
Kenneth C. Dyke, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/927,671

(22) Filed: Jun. 26, 2013

(65) Prior Publication Data

US 2013/0335443 A1     Dec. 19, 2013

Related U.S. Application Data

(63) Continuation of application No. 12/397,334, filed on Mar. 3, 2009, now Pat. No. 8,477,143.

(60) Provisional application No. 61/033,753, filed on Mar. 4, 2008.

(51) Int. Cl.
    G09G 5/00    (2006.01)
    G09G 5/02    (2006.01)
    G06F 15/80   (2006.01)

(52) U.S. Cl.
    USPC ............................. 345/629; 345/603; 345/505

(58) Field of Classification Search
    CPC combination set(s) only.
    See application file for complete search history.

(56) References Cited

U.S. PATENT DOCUMENTS

| 6,300,947 | B1 | 10/2001 | Kanevsky |
| 6,323,846 | B1 | 11/2001 | Westerman et al. |
| 6,570,557 | B1 | 5/2003 | Westerman et al. |
| 6,677,932 | B1 | 1/2004 | Westerman |
| 6,697,063 | B1 | 2/2004 | Zhu |
| 6,820,133 | B1 | 11/2004 | Grove et al. |
| 6,888,536 | B2 | 5/2005 | Westerman et al. |
| 7,065,707 | B2 | 6/2006 | Chen et al. |
| 7,197,702 | B2 | 3/2007 | Niyogi et al. |
| 7,272,787 | B2 | 9/2007 | Nakamura et al. |
| 7,362,311 | B2 | 4/2008 | Filner et al. |
| 7,383,412 | B1 | 6/2008 | Diard |

(Continued)

FOREIGN PATENT DOCUMENTS

| EP | 1351477 A1 | 10/2003 |
| EP | 1 450 257 A2 | 8/2004 |
| EP | 1 450 257 A3 | 8/2004 |
| WO | WO 2008/019222 A1 | 2/2008 |

OTHER PUBLICATIONS

Elina Vartiainen, Virpi Roto, Janne Kaasalainen, "Graphical History List with Multi-Window Support on a Mobile Web Browser", IEEE, 2008, pp. 121-129, Finland.

(Continued)

*Primary Examiner* — Kee M Tung
*Assistant Examiner* — Leon T Cain, II
(74) *Attorney, Agent, or Firm* — Blakely, Sokoloff, Taylor & Zafman LLP

(57) ABSTRACT

Embodiments enable a graphics processor to more efficiently process graphics and compositing processing commands. In certain embodiments, a client application submits client graphics commands to a graphics driver. The client in certain embodiments can notify a window server that client graphics commands have been submitted. In response, the window server can generate compositing processing commands and provide these commands to the graphics driver. Advantageously, a graphics processor can execute the client graphics commands while the window server generates compositing processing commands. As a result, processing resource can be used more efficiently.

37 Claims, 8 Drawing Sheets

(56) References Cited

U.S. PATENT DOCUMENTS

| | | |
|---|---|---|
| 7,412,644 B2 | 8/2008 | Kieffer |
| 7,417,645 B2 | 8/2008 | Beda et al. |
| 7,499,051 B1 * | 3/2009 | O'Donnell .................... 345/421 |
| 7,627,723 B1 | 12/2009 | Buck et al. |
| 2002/0057446 A1 | 5/2002 | Long et al. |
| 2002/0078115 A1 | 6/2002 | Poff et al. |
| 2003/0023755 A1 | 1/2003 | Harris et al. |
| 2003/0237053 A1 | 12/2003 | Chen et al. |
| 2004/0012627 A1 | 1/2004 | Zakharia et al. |
| 2004/0221004 A1 | 11/2004 | Chalfin et al. |
| 2005/0012751 A1 | 1/2005 | Karlov |
| 2005/0088446 A1 | 4/2005 | Herrick et al. |
| 2005/0154982 A1 | 7/2005 | Berg |
| 2007/0113179 A1 | 5/2007 | Gibbs et al. |
| 2007/0153004 A1 | 7/2007 | Airey et al. |
| 2007/0192818 A1 | 8/2007 | Bourges-Sevenier et al. |
| 2007/0288841 A1 | 12/2007 | Rohrabaugh et al. |
| 2007/0294646 A1 | 12/2007 | Timmons |
| 2008/0005547 A1 * | 1/2008 | Papakipos et al. ............ 712/244 |
| 2008/0034292 A1 | 2/2008 | Brunner et al. |
| 2008/0074432 A1 | 3/2008 | Sun et al. |
| 2008/0082907 A1 | 4/2008 | Sorotokin et al. |
| 2008/0120626 A1 | 5/2008 | Graffagnino et al. |
| 2008/0136827 A1 | 6/2008 | Bakalash et al. |
| 2008/0148144 A1 | 6/2008 | Tatsumi |
| 2008/0165199 A1 | 7/2008 | Wei et al. |
| 2008/0211816 A1 | 9/2008 | Gonzalez et al. |
| 2009/0150654 A1 | 6/2009 | Oberman et al. |
| 2009/0199219 A1 | 8/2009 | Rofougaran et al. |
| 2009/0225093 A1 | 9/2009 | Harper et al. |
| 2011/0169841 A1 | 7/2011 | Bakalash et al. |

OTHER PUBLICATIONS

PCT Search Report and Written Opinion for PCT/US2009/001426 mailed Aug. 4, 2009, 12 pages.
PCT Search Report and Written Opinion for PCT/US2009/001414 mailed Jul. 2, 2009, 16 pages.
Ribble, Maurice, "Next-Gen Tile-Based GPUs," GameDevelopers Conference Mobile 08, San Francisco, Feb. 18-22, 2008, XP007908783, http://ati.amd.com/developer/gdc/2008/gdc2008_ribble_maurice_TileBasedGpus.pdf, pp. 1-36.
Akenine-Mökker T., et al., "Real-Time Rendering, Graphics Hardware, Case Study: KYRO," Real-Time Rendering, Natick, Mass., Jan. 1, 2002, XP002517007, pp. 705-708.
PCT Search Report and Written Opinion for PCT/US2009/001416 mailed Jun. 30, 2009, 12 pages.

* cited by examiner

BUFFERS FOR DISPLAY ACCELERATION

This application is a continuation of co-pending U.S. application Ser. No. 12/397,334 filed on Mar. 3, 2009, which claims priority to U.S. Provisional Application No. 61/033,753 filed on Mar. 4, 2008, which provisional application is incorporated herein by reference in its entirety. This application is related to U.S. patent application Ser. No. 12/397,330 filed on Mar. 3, 2009.

BACKGROUND

Many types of media devices currently exist for presenting media content to a user. For example, televisions, radios, computers, and a variety of portable or handheld devices are available for presenting various types of audio and/or visual information to a user. Some examples of portable devices include music players (e.g., MP3 players), cell phones, smart phones, personal digital assistants (PDAs), portable televisions, laptops, and the like.

In presenting media to a user, media devices generally display graphics and/or video content. Some media devices display multiple types of content at once by layering one type of content over another. For example, a user interface layer might include a status bar that is displayed at the same time as a video layer is displayed. The process of generating a combination of multiple layers for display can be referred to as compositing.

One drawback to compositing is that it can be resource intensive, causing some devices to suffer in performance. For portable devices that tend to have lower processing and/or memory power, the performance loss can be significant.

DETAILED DESCRIPTION

In certain embodiments, systems and methods are provided for managing a display that address some or all of the above-mentioned problems. For example, in certain embodiments systems and methods are provided for enabling a graphics processor to process certain commands while compositing processing commands are being generated. In certain embodiments, these compositing processing commands are provided to the graphics processor without the graphics processor or its driver have to request them. As a result, processing resources can be used more efficiently to improve performance in certain implementations.

The features of these systems and methods will now be described with reference to the drawings summarized above. Throughout the drawings, reference numbers are re-used to indicate correspondence between referenced elements. The drawings, associated descriptions, and specific implementation are provided to illustrate embodiments of the inventions disclosed herein and not to limit the scope of the inventions disclosed herein.

In addition, methods and processes described herein are not limited to any particular sequence, and the blocks or states relating thereto can be performed in other sequences that are appropriate. For example, described blocks or states may be performed in an order other than that specifically disclosed, or multiple blocks or states may be combined into a single block or state. Moreover, the various modules of the systems described herein can be implemented as software applications, modules, or components on one or more computers, such as servers. While the various modules are illustrated separately, they may share some or all of the same underlying logic or code.

Figure 1:
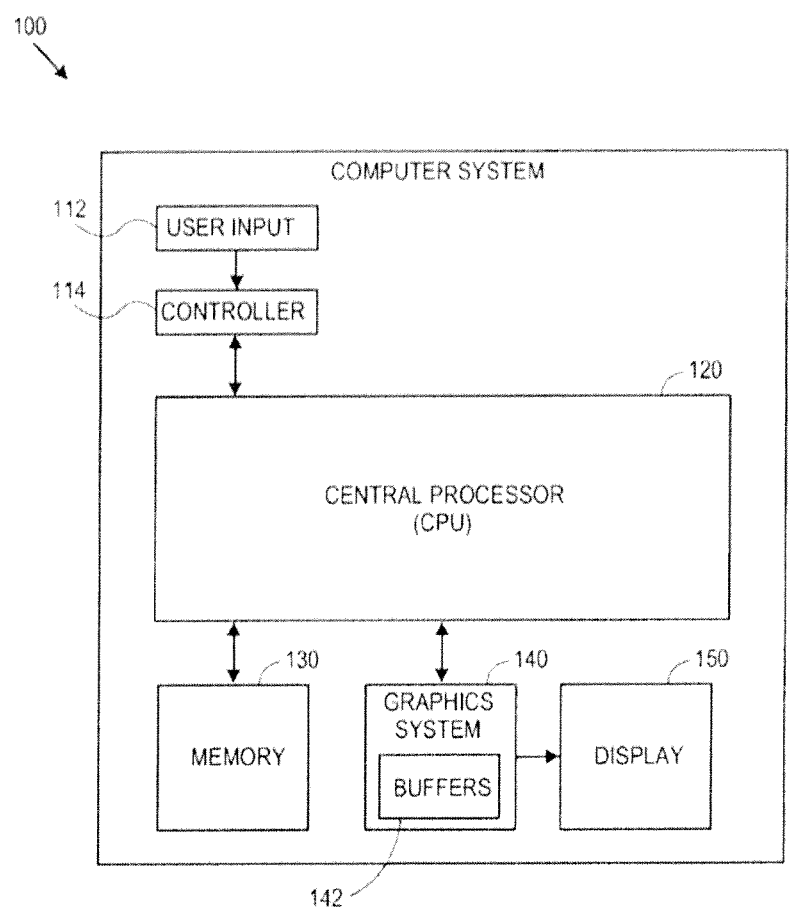
FIG. 1 is a block diagram illustrating an embodiment of a computer system.

FIG. 1 illustrates an example computer system 100. Computer system 100 can be implemented as any device that can be used for processing graphics or video images, such as a media device. Advantageously, in certain embodiments, computer system 100 can be configured such that graphical operations in computer system 100 can be performed more efficiently than in previous devices.

In certain embodiments, computer system 100 can include general purpose (e.g., PC or Apple Mac) and special purpose e.g., graphics work stations) computer systems, which may include one or more services, databases, and the like. In addition, computer system 100 can be a hand-held or portable device, such as a laptop, personal digital system (PDA), cell phone, smart phone, or the like. More generally, any processor-based system may be used as computer system 100.

Computer system 100 can include one or more user-input devices 112. One user input device 112 is shown for illustrative purposes. User-input device 112 can be any device such as a mouse, keyboard, or the like. User-input devices 112 receives input from one or more users and provides the input to controller 114. Controller 114 can include interface logic or the like that enables user-input device 112 to communicate with central processor (CPU) 120.

CPU 120 is included in computer system 100 for receiving input from user input devices 112 and for processing one or more software programs stored in memory 130. In addition, CPU 120 can output images and video to display 150 through graphics system 140. While one CPU 120 is illustrated, computer system 100 in certain embodiments can include, by way of example, one or more additional processors, program logic, or other substrate configurations representing data and instructions which can operate as described herein. In certain embodiments, CPU 120 can include controller circuitry, processor circuitry, single or multi-core processors including stream processors, general purpose, single-chip or multi-chip microprocessors, digital signal processors, embedded microprocessors, microcontrollers, graphics processors, and the like.

Graphics system 140, in certain embodiments, includes one or more graphics processors (GPU), memory controllers and the like. The GPU (not shown) of graphic system 140 can have a single core or multiple cores and may have multiple stream processors in certain implementations.

Graphics system 140, in certain embodiments, includes buffers 142, which may enhance processing efficiency of the graphics system 140. Buffers 142 can increase the efficiency, for example, of compositing processing of graphics and/or video images. In one implementation, buffers 142 facilitate increased processing efficiency by reducing CPU idle cycles which can occur if the GPU waits for compositing processing commands.

The functions and advantages of certain embodiments of graphics system 140 are described in greater detail below with respect to FIGS. 2 through 5.

Figure 2:
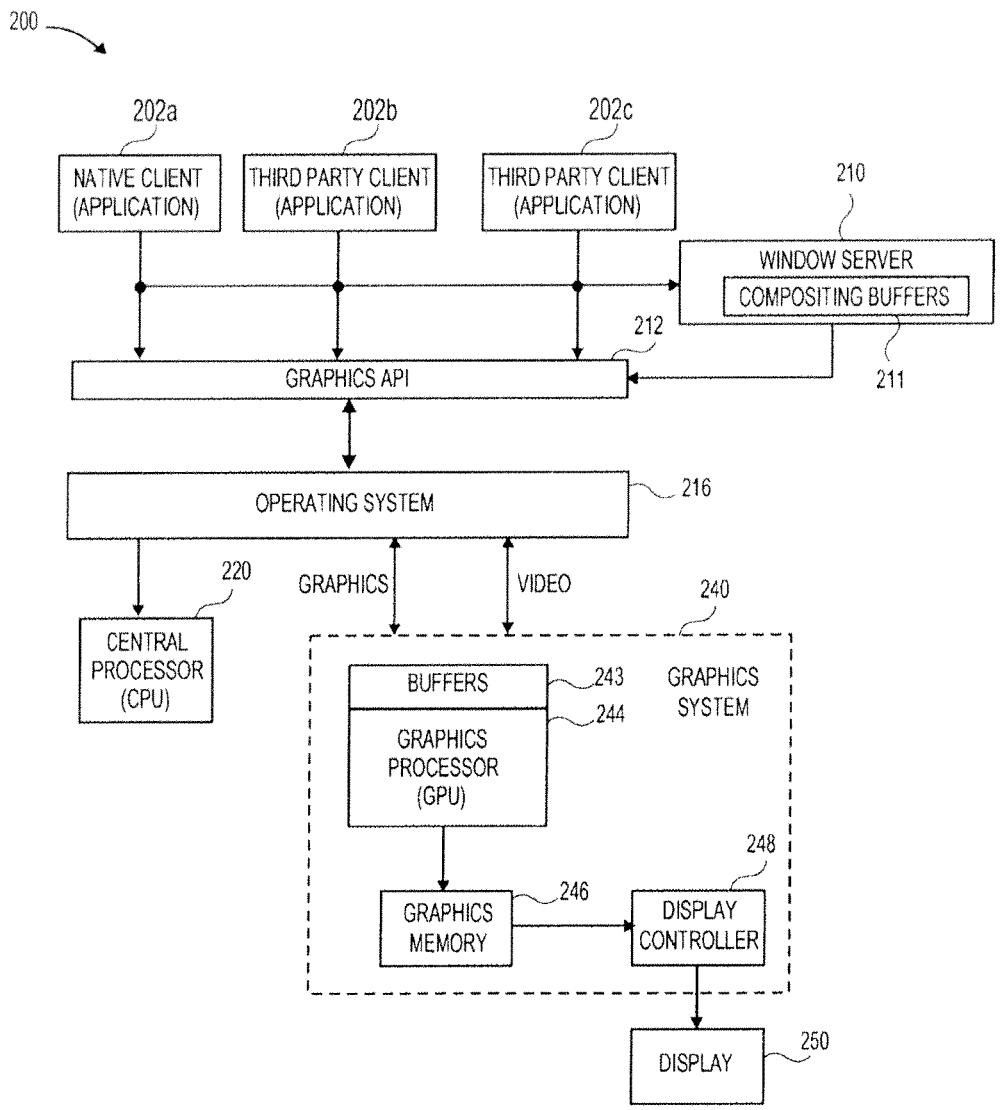
FIG. 2 is a block diagram illustrating a more detailed embodiment of the computer system of FIG. 1.

FIG. 2 illustrates a more detailed view of example computer system 200. Computer system 200 of certain embodiments includes graphics system 240 which can provide more efficient compositing processing of graphics and/or video.

In certain embodiments, one or more clients 202 or applications can run on computer system 200, for example, in a memory device (not shown). Clients 202 can include native clients 202*a* and third-party clients 202*b*, 202*c*. Native clients 202*a* can include applications that are provided by a vendor of computer system 200. Common examples of native clients 202*a* include media players, calendaring applications, web browsers, system utilities, and the like. Third-party clients 202*b*, 202*c*, can include any application developed by a third party for computer system 200. Some examples include games, office software, and the like.

Certain clients 202 can send graphics routine calls to window server 210. Window server 210, in certain embodiments, is a module for managing the compositing of layers in graphical images and/or video. Window server 210 can be, in one implementation, the Core Animation system provided by Apple Inc. In one such embodiment, the computer system 200 can be implemented in a media device such as the Apple iPhone.

In certain embodiments, window server 210 responds to graphics routine calls from clients 202*a* and 202*b* by compositing graphics and/or video layers corresponding to different clients, an operating system 216 user interface, combinations of the same, and the like. These layers may include video layers, graphics layers, effects layers such as transparency (graphics) layers, and other layers. As one example of compositing, window server 210 can composite a user interface layer, such as a popup message, with a video game layer. Thus, for example, a smart phone or the like implementing system 200 can alert a user to an incoming call by overlaying an application with a popup message. In other examples, window server 210 can composite a user interface status bar with a client 202 window, a volume control over a media application, one client 202 window over another client 202 window, and the like. Window server 210 in certain embodiments also provides animation services to clients 202 and may generate and/or manage user interface windows.

In some currently-available systems, clients generate graphics commands by communicating directly with a window server. The window server in turn can use a graphics application programming interface (API) to generate graphics commands. As a result, the window server in these currently-available systems can arbitrate compositing between clients. In the system 200, however, clients 202 can generate graphics commands both by using window server 210 and also by directly using graphics API 212. Because the system 200 enables the clients 202 to generate graphics commands directly with the graphics API 212, the window server 210 may not arbitrate all graphics commands from the clients 202. Thus, to determine which images from which clients are to be composited, the clients 202 can inform window server 210 each time the clients 202 generate an image, or each time they begin generating graphics commands. Alternatively, window server 210 can monitor each client 202 to determine when clients 202 are generating graphics commands.

If window server 210 detects (or is notified) that a client 202 is generating an image, window server 210 can determine if compositing processing is to be used. Advantageously, window server 210 can generate compositing graphics commands while clients 202 user graphics API 21 to generate the clients' 202 graphics commands. Window server 210 can store the compositing graphics commands for various layers in one or more compositing buffers 211, which can be flushed when the graphics system 240 is ready to receive the compositing commands. Further details on using window server 210 to manage compositing processing are described below with respect to FIGS. 3-5.

Graphics API 212 can include routines for generating graphics commands for graphics system 240. Example graphics APIs include OpenGL, OpenGL ES, and DirectX, and the like. By implementing certain routines from graphics API 212, window server 210 or certain clients 202 can send routine calls to operating system 216.

Operating system 216 may include one or more drivers (not shown), such as graphics drivers that translate the generated graphics commands into commands for GPU 244 of graphics system 240. In addition, the drivers can include display drivers for converting outputs from GPU 244 into an image on display 250. Operating system 216 can interact with central processor (CPU) 220 to implement clients 202 and certain graphics preprocessing functions. For example, certain compositing preprocessing functions generated by window server 210 can be implemented by CPU 220. In addition, the drivers can be implemented using CPU 220.

Operating system 216, in certain embodiments, also provides graphics and video commands to graphic system 240. Graphics commands can include, for example, commands related to processing images using an RGB format. Video commands can include commands related to processing video streams and images using a YUV format. Other formats may be used in certain embodiments. As used herein, in addition to its broad ordinary meaning, the term "graphics commands" can refer to both graphics and video commands in certain embodiments.

The various graphics and/or video commands for each frame of image data are received in graphic system 240 by one or more command buffers 243. In certain embodiments, command buffers 243 include a pool of buffers stored in graphics memory 246 or in system memory (e.g., memory 130 of FIG. 1). The command buffers 243 can be configured as queues or as other data structures. Command buffers 243 in certain embodiments store graphics and video commands until they are ready for processing by GPU 244.

Graphics processor GPU 244 in various embodiments uses graphics memory 246 to store frames of images created by executing graphics commands. In some embodiments, the GPU 244 does not have its own memory, but instead shares memory with CPU 220. The frames can be provided to display controller 248, which in turn provides the frame or image to display 250.

Figure 3:
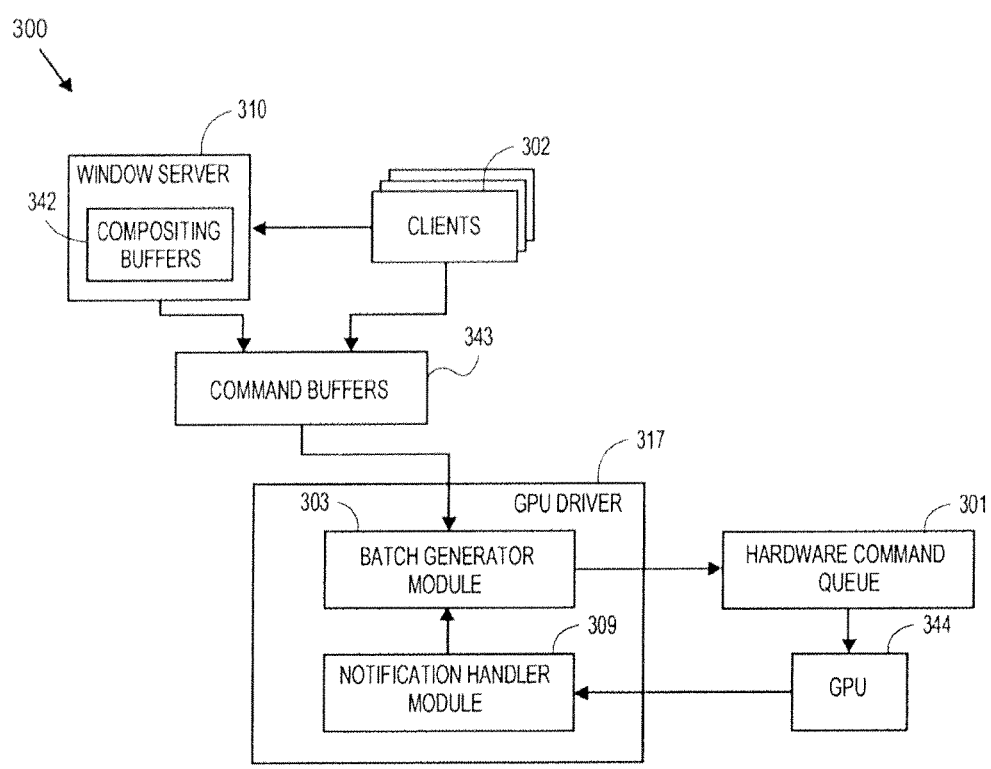
FIG. 3 is a block diagram illustrating an embodiment of a graphics system of the computer system of FIG. 2.

FIG. 3 illustrates an example graphics processing system 300 for processing graphics commands. System 300 may be integrated with any of the systems described above, such as systems 100 and 200. Advantageously, the system 300 facilitates ordering graphics commands from different clients in an efficient manner.

One or more clients 302 generate sets of graphics commands, where each set of graphics commands corresponds to an image. Clients 302 may write these commands to command buffers 343 asynchronously. A GPU driver 317, described below, can process sets of graphics commands in the order in which they were written to command buffers 343.

Thus, sets of commands in command buffers 343 can be executed in a first-in, first-out (FIFO) manner. In one embodiment, one command buffer 343 can be used for the each set of commands.

In addition to writing the graphics commands to a command buffer 343, each client 302 can inform window server 310 of the new image corresponding to the graphics commands. Alternatively, window server 310 can detect the generation of the graphics commands. Window server 310 can analyze the image to determine if compositing processing is to be used to combine the image with one or more other graphics and/or video layers of other clients or user interface elements.

If window server 310 determines from its analysis of an image e.g., a set of commands for an image) that compositing processing is to be used, window server 310 can generate compositing graphics commands and store these commands into one or more compositing buffers 342. Advantageously, window server 310 can generate compositing commands while or substantially while GPU 344 executes the commands for client 302 stored in command buffer 343.

In certain embodiments, GPU driver 317 obtains the graphics commands corresponding to client 302 from command buffer 343. GPU driver 317 may include batch generator module 303, which prepares a batch of graphics commands corresponding to the graphics commands retrieved from command buffers 343. Batch generator module 303 can send a batch of graphics commands together in a single transaction to GPU 344. In one embodiment, a batch of graphics commands can correspond to one frame of image data.

A hardware command queue 301 may be coupled to GPU 344. Hardware command queue 301 may be associated with an input/output (I/O) port of GPU 344. Hardware command queue 301 can receive the batch of graphics commands and provide the commands to GPU 344. GPU 344 can then execute the commands. Advantageously, GPU 344 can execute the commands while window server 310 generates compositing commands. More detailed timing of the execution of commands is illustrated with respect to FIG. 4 below.

In certain embodiments, GPU 344 sends a notification message to a notification handler module 309 of GPU driver 317. A notification message can be generated, for example, by an interrupt from GPU 344 to a CPU hosting CPU driver 317. Notification handler module 309 can in turn notify batch generate module 303 that GPU 344 is ready to receive additional commands. In response, batch generate module 303 can send additional commands to hardware command queue 301.

Figure 4:
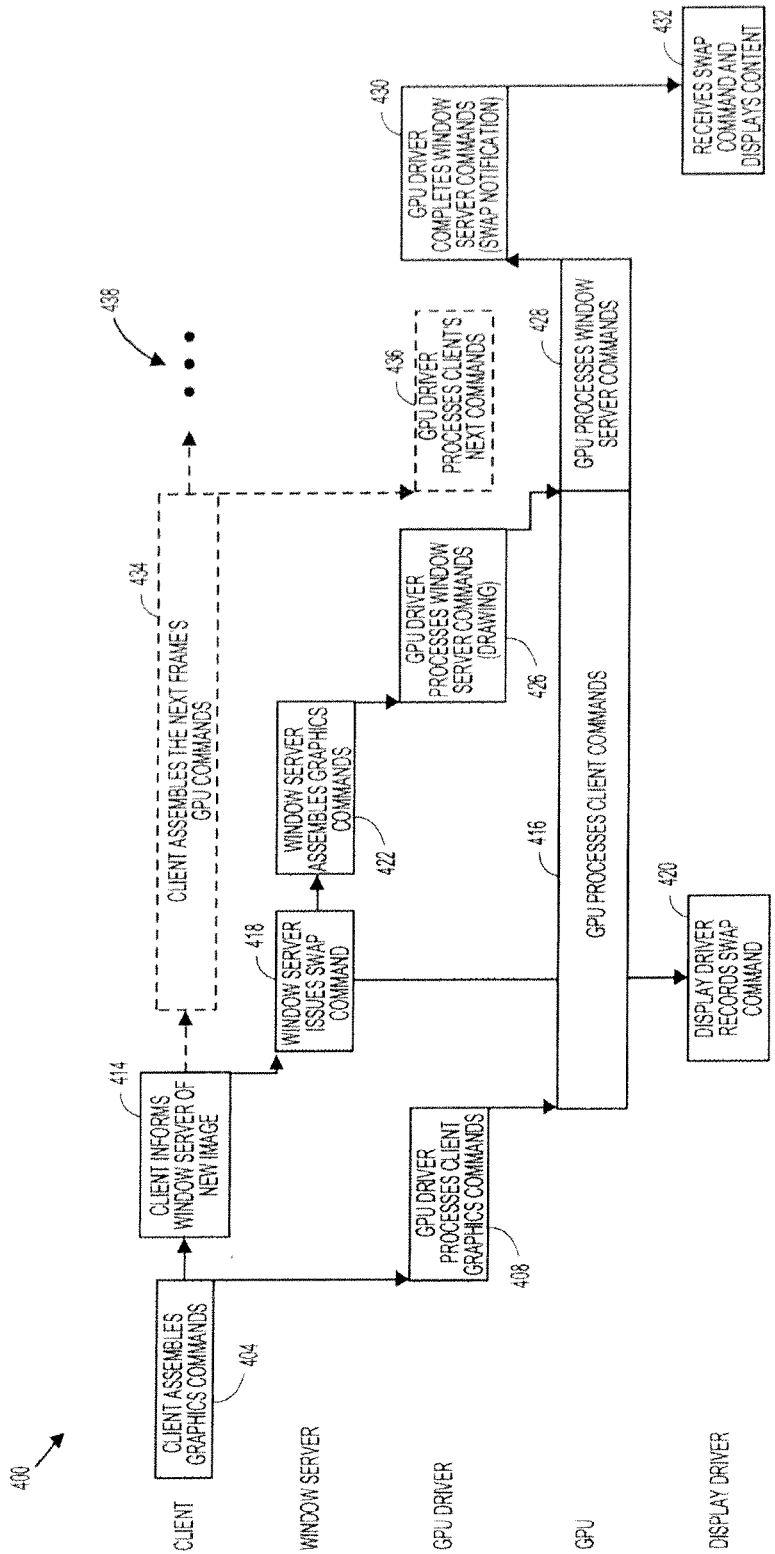
FIG. 4 is a timing diagram illustrating an embodiment of a process for managing a display using the system of FIG. 3.

FIG. 4 illustrates an example timing diagram 400. Timing diagram 400, in certain embodiments, shows one example implementation of processing timing of any of the systems described herein, such as the graphics processing system 300. Advantageously, timing diagram 400 illustrates the use of more efficient graphics processing, which can include parallel processing in certain embodiments.

To the left of timing diagram 400 are shown certain components from certain of the systems described above. These components include a client or application, window server, GPU driver, GPU, and display driver. To the right of each component are a series of blocks that illustrate actions that can be performed by particular components. For example, to the right of the client are blocks 404, 414, and 434, which include actions that can be performed by the client. Similarly, blocks 418 and 422 to the right of the window server can be performed by the window server, and so on.

Starting at an initial time at block 404, the client assembles a set of graphics commands. The client can be any of the applications described above, including native and third party applications. The set of graphics commands assembled by the client in one embodiment correspond to one frame or image. In one embodiment, assembling graphics commands includes storing the commands in a command buffer, such as the command buffer 343.

Thereafter, these commands are provided from the command buffer to the GPU driver at block 408. At block 408, the GPU driver processes the clients' graphics commands received from the command buffer, The GPU driver provides the commands to the CPU, which at block 416 processes the client commands.

The client at block 414, after providing the commands to the GPU driver may inform the window server of the new image commands. At block 418, in response, the window server issues a swap command to the display driver. At block 420, the display driver records the swap command. In certain embodiments, the swap command can tell the display driver to combine multiple images layers but to wait to do so until the display driver receives a swap notification (see blocks 430-432).

At block 422, the window server determines if compositing processing is to be performed and assembles graphics commands related to that compositing processing. Compositing processing may be performed, for example, if another client exists that has written or is also writing an image on the screen. The second client might include, for example, user interface elements such as a popup window or the like. In certain embodiments, the window server can generate graphics commands to composite multiple images or image layers with the new image submitted by the client. In assembling the graphics commands, the window server may store the commands in a compositing buffer, such as one of the compositing buffers 342 described above with respect to FIG. 3.

In one embodiment, if a 3D layer can be detached from an image frame, the window server can generate a set of 2D or 3D graphics commands to assemble the rest of the layers (e.g., a user interface), except for the detached 3D image. If the 3D layer cannot be detached, the GPU may be used to composite the 3D image with the rest of the layers instead. If the GPU is to perform some of the compositing, the window server can still generate some 2D or 3D compositing commands that read from the client's image.

In one embodiment, the window server appends a swap notification to the graphics command stored in the compositing buffer. The swap notification can be used to trigger the display to display the new image and any composited layers (see blocks 430-432). If there are no layers to be composited with the client's new image, the window server may still generate the swap notification.

Advantageously, the window server in certain embodiments assembles and stores the graphics commands while the GPU is processing the client's graphics commands at block 416. As a result, compositing commands are being generated, for example, by a CPU while the GPU is processing the client's graphics commands. The CPU and GPU are therefore working in parallel in certain embodiments, thereby achieving greater processing efficiency than in currently available devices. This efficiency can be particularly advantageous for mobile devices such as smartphones, which may have limited processing resources.

The window server provides the graphics commands to the GPU driver, which processes the commands at block 426. The GPU driver then provides the window server's graphics commands to the GPU. At block 428, the GPU executes the window servers' graphics commands. As a result, the GPU may therefore first process the client's commands and then process the window server's commands. Thereafter, the GPU driver completes the window server commands at block 430, which can include performing the swap notification. At block 432, the display driver receives the swap notification and displays the image and any composited layers.

Returning to a previous point in time, after block 414 the client also assembles graphics commands for the next frame or image at block 434. The client assembles these commands by generating graphics commands and storing them in one of the command buffers, as described above. Thus, while the GPU is processing the client commands at block 416, the client can be using the CPU in parallel to assemble the next frame's graphics commands at block 434. At block 436, the GPU driver processes the client's next commands. Ellipsis 438 illustrates that the process illustrated by the timing diagram 400 can continue in a parallel fashion or pipelined fashion. Advantageously, the parallel or pipelined nature of the processing shown illustrates the efficiency that can be achieved using certain embodiments of the systems described herein.

One advantage of certain embodiments of the process illustrated by the timing diagram 400 is minimization of context switches. For example, to minimize context switching in the CPU, in one embodiment the contexts are cycle in order as follows: the first CPU processes the client, and then the window server, followed by the GPU driver, and ending with the display driver. The order of context switching can be varied in certain embodiments.

In addition, the process of providing swap notifications can be abstracted away from the client. As a result, the client can create its own graphics commands while the window server creates its own graphics commands. Additional clients can also generate graphics commands, and due to the structure of the timing diagram 400, these graphics commands can be executed in order as they are received. Thus, synchronization can advantageously be performed between multiple clients without the window server arbitrating graphics requests between clients.

Figure 5:
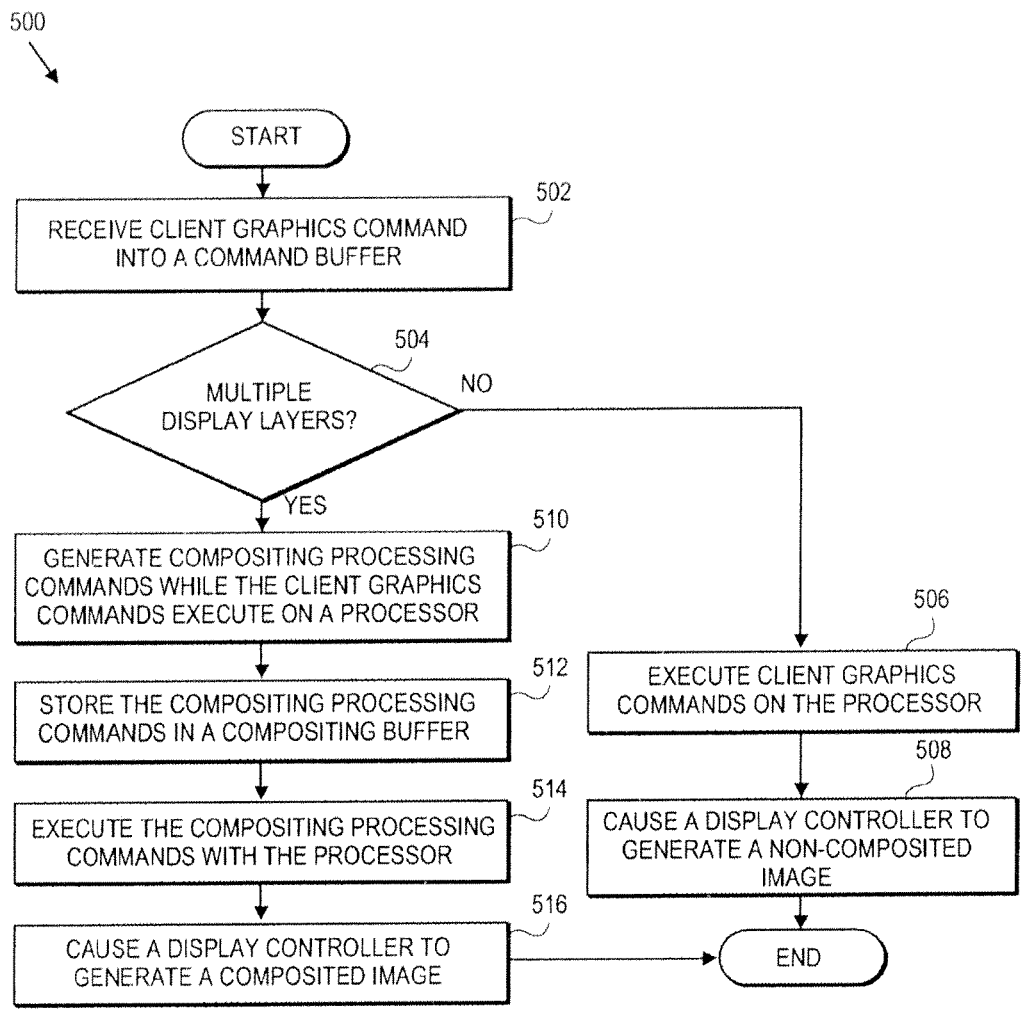
FIG. 5 is a flowchart diagram illustrating an embodiment of a process for managing a display.

FIG. 5 illustrates an example process 500 for managing a display. Process 500 can be implemented in certain embodiments by any of the systems described above, such as the systems 100, 200, or 300. Advantageously, process 500 enables a computer system to more efficiently process graphics elements such as composited graphics elements.

At block 502, client graphics commands are received into a command buffer. The client graphics commands can correspond to an image frame of a client application, which may include a native or third-party application. In one embodiment, the client graphics commands may be provided into the command buffer by a client application or graphics API.

At block 504, it is determined whether multiple display layers are to be composited. This block 504 can be performed by a window server in certain embodiments. If a single display layer is to be displayed there will be no compositing processing), at block 506 the client graphics commands are executed on a processor, such as a graphics processor. Continuing at block 508, a display controller can be caused to generate a non-composited image based on the executed graphics commands. This block 508 can be performed in one embodiment by a display controller or the like.

If multiple displays are to be composited, at block 510 compositing processing commands are generated. Advantageously, these compositing processing commands can be generated by a window server while the client graphics commands are being executed on a processor such as a GPU. At block 512, these compositing processing commands may be stored in a compositing buffer.

Once the client graphics commands have been executed by the processor, the compositing commands can be executed by the processor at block 514. Thereafter, a display controller can generate a composited image at block 516.

Figure 6A:
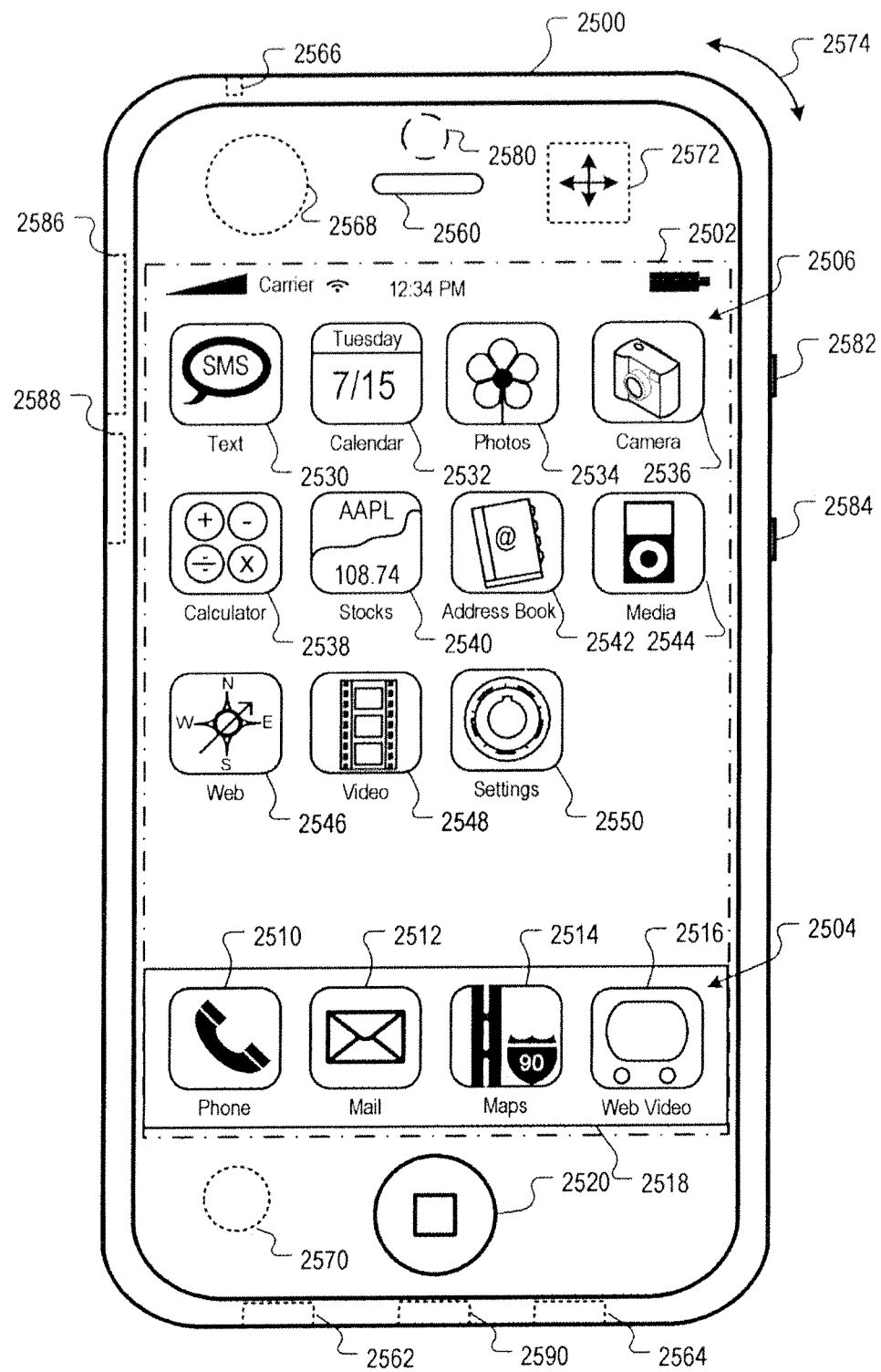
FIG. 6A is an elevation-view diagram illustrating an example mobile device that can be used with certain embodiments of the systems of FIGS. 1 through 3.

FIG. 6A illustrates an example mobile device 2500. The mobile device 2500 can be, for example, a handheld computer, a personal digital assistant, a cellular telephone, a network appliance, a camera, a smart phone, an enhanced general packet radio service (EGPRS) mobile phone, a network base station, a media player, a navigation device, an email device, a game console, or a combination of any two or more of these data processing devices or other data processing devices.

Mobile Device Overview

In some implementations, the mobile device 2500 includes a touch-sensitive display 2502. The touch-sensitive display 2502 can be implemented with liquid crystal display (LCD) technology, light emitting polymer display (LPD) technology, or some other display technology. The touch sensitive display 2502 can be sensitive to haptic and/or tactile contact with a user.

In some implementations, the touch-sensitive display 2502 can include a multi-touch-sensitive display 2502. A multi-touch-sensitive display 2502 can, for example, process multiple simultaneous touch points, including processing data related to the pressure, degree, and/or position of each touch point. Such processing facilitates gestures and interactions with multiple fingers, chording, and other interactions. Other touch-sensitive display technologies can also be used, e.g., a display in which contact is made using a stylus or other pointing device. Some examples of multi-touch-sensitive display technology are described in U.S. Pat. Nos. 6,323,846, 6,570,557, 6,677,932, and 6,888,536, each of which is incorporated by reference herein in its entirety.

In some implementations, the mobile device 2500 can display one or more graphical user interfaces on the touch-sensitive display 2502 for providing the user access to various system objects and for conveying information to the user. In some implementations, the graphical user interface can include one or more display objects 2504, 2506. In the example shown, the display objects 2504, 2506, are graphic representations of system objects. Some examples of system objects include device functions, applications, windows, files, alerts, events, or other identifiable system objects.

Example Mobile Device Functionality

In some implementations, the mobile device 2500 can implement multiple device functionalities, such as a telephony device, as indicated by a Phone object 2510; an e-mail device, as indicated by the Mail object 2512; a map devices, as indicated by the Maps object 2514; a Wi-Fi base station device (not shown); and a network video transmission and display device, as indicated by the Web Video object 2516. In some implementations, particular display objects 2504, e.g., the Phone object 2510, the Mail object 2512, the Maps object 2514, and the Web Video object 2516, can be displayed in a menu bar 518. In some implementations, device functionalities can be accessed from a top-level graphical user interface, such as the graphical user interface illustrated in FIG. 6A. Touching one of the objects 2510, 2512, 2514, or 2516 can, for example, invoke a corresponding functionality.

In some implementations, the mobile device 2500 can implement a network distribution functionality. For example, the functionality can enable the user to take the mobile device 2500 and provide access to its associated network while traveling. In particular, the mobile device 2500 can extend Internet access (e.g., Wi-Fi) to other wireless devices in the vicinity. For example, mobile device 2500 can be configured as a base station for one or more devices. As such, mobile device 2500 can grant or deny network access to other wireless devices.

In some implementations, upon invocation of a device functionality, the graphical user interface of the mobile device 2500 changes, or is augmented or replaced with another user interface or user interface elements, to facilitate user access to particular functions associated with the corresponding device functionality. For example, in response to a user touching the Phone object 2510, the graphical user interface of the touch-sensitive display 2502 may present display objects related to various phone functions; likewise, touching of the Mail object 2512 may cause the graphical user interface to present display objects related to various e-mail functions; touching the Maps object 2514 may cause the graphical user interface to present display objects related to various maps functions; and touching the Web Video object 2516 may cause the graphical user interface to present display objects related to various web video functions.

In some implementations, the top-level graphical user interface environment or state of FIG. 6A can be restored by pressing a button 2520 located near the bottom of the mobile device 2500. In some implementations, each corresponding device functionality may have corresponding "home" display objects displayed on the touch-sensitive display 2502, and the graphical user interface environment of FIG. 6A can be restored by pressing the "home" display object.

In some implementations, the top-level graphical user interface can include additional display objects 2506, such as a short messaging service (SMS) object 2530, a Calendar object 2532, a Photos object 2534, a Camera object 2536, a Calculator object 2538, a Stocks object 2540, a Address Book object 2542, a Media object 2544, a Web object 2546, a Video object 2548, a Settings object 2550, and a Notes object (not shown). Touching the SMS display object 2530 can, for example, invoke an SMS messaging environment and supporting functionality; likewise, each selection of a display object 2532, 2534, 2536, 2538, 2540, 2542, 2544, 2546, 2548, and 2550 can invoke a corresponding object environment and functionality.

Additional and/or different display objects can also be displayed in the graphical user interface of FIG. 6A. For example, if the device 2500 is functioning as a base station for other devices, one or more "connection" objects may appear in the graphical user interface to indicate the connection. In some implementations, the display objects 2506 can be configured by a user, e.g., a user may specify which display objects 2506 are displayed, and/or may download additional applications or other software that provides other functionalities and corresponding display objects.

In some implementations, the mobile device 2500 can include one or more input/output (I/O) devices and/or sensor devices. For example, a speaker 2560 and a microphone 2562 can be included to facilitate voice-enabled functionalities, such as phone and voice mail functions. In some implementations, an up/down button 2584 for volume control of the speaker 2560 and the microphone 2562 can be included. The mobile device 2500 can also include an on/off button 2582 for a ring indicator of incoming phone ca Is. In some implementations, a loud speaker 2564 can be included to facilitate hands-free voice functionalities, such as speaker phone functions. An audio jack 2566 can also be included for use of headphones and/or a microphone.

In some implementations, a proximity sensor 2568 can be included to facilitate the detection of the user positioning the mobile device 2500 proximate to the user's ear and, in response, to disengage the touch-sensitive display 2502 to prevent accidental function invocations. In some implementations, the touch-sensitive display 2502 can be turned off to conserve additional power when the mobile device 2500 is proximate to the user's ear.

Other sensors can also be used. For example, in some implementations, an ambient light sensor 2570 can be utilized to facilitate adjusting the brightness of the touch-sensitive display 2502. In some implementations, an accelerometer 2572 can be utilized to detect movement of the mobile device 2500, as indicated by the directional arrow 2574. Accordingly, display objects and/or media can be presented according to a detected orientation, e.g., portrait or landscape. In some implementations, the mobile device 2500 may include circuitry and sensors for supporting a location determining capability, such as that provided by the global positioning system (GPS) or other positioning systems (e.g., systems using Wi-Fi access points, television signals, cellular grids, Uniform Resource Locators (URLs)). In some implementations, a positioning system (e.g., a GPS receiver) can be integrated into the mobile device 2500 or provided as a separate device that can be coupled to the mobile device 2500 through an interface (e.g., port device 2590) to provide access to location-based services.

In some implementations, a port device 2590, e.g., a Universal Serial Bus (USB) port, or a docking port, or some other wired port connection, can be included. The port device 2590 can, for example, be utilized to establish a wired connection to other computing devices, such as other communication devices 2500, network access devices, a personal computer, a printer, a display screen, or other processing devices capable of receiving and/or transmitting data. In some implementations, the port device 2590 allows the mobile device 2500 to synchronize with a host device using one or more protocols, such as, for example, the TCP/IP, HTTP, UDP and any other known protocol.

The mobile device 2500 can also include a camera lens and sensor 2580. In some implementations, the camera lens and sensor 2580 can be located on the back surface of the mobile device 2500. The camera can capture still images and/or video.

The mobile device 2500 can also include one or more wireless communication subsystems, such as an 802.11b/g communication device 2586, and/or a Bluetooth™ communication device 2588. Other communication protocols can also be supported, including other 802.x communication protocols WiMax, Wi-Fi, 3G), code division multiple access (CDMA), global system for mobile communications (GSM), Enhanced Data GSM Environment (EDGE), etc.

Example Configurable Top-Level Graphical User Interface

Figure 6B:
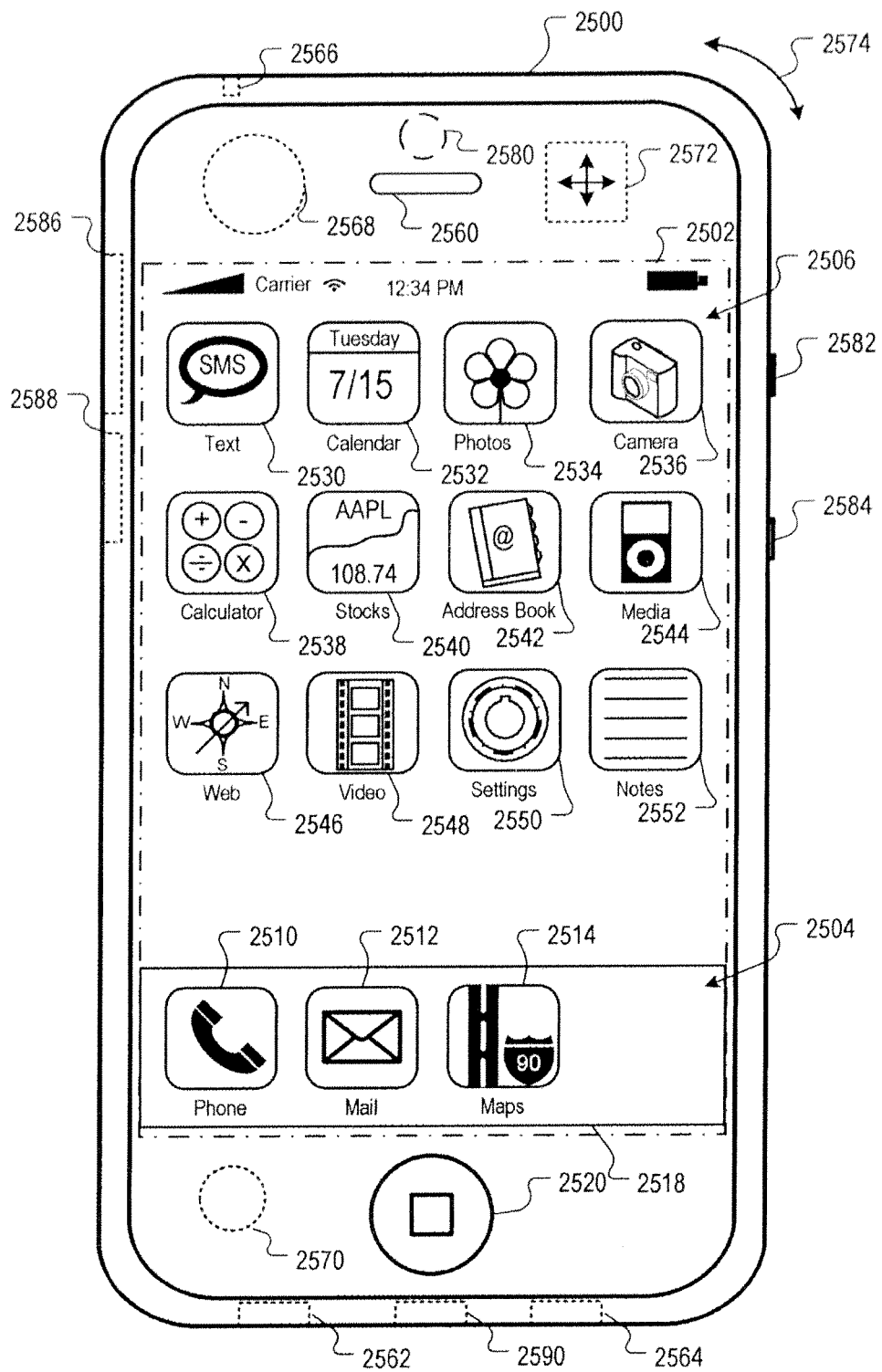
FIG. 6B is an elevation-view diagram illustrating an example of a configurable top-level graphical user interface for the mobile device of FIG. 6A.

FIG. 6B illustrates another example of configurable top-level graphical user interface of device 2500. The device 2500 can be configured to display a different set of display objects.

In some implementations, each of one or more system objects of device 2500 has a set of system object attributes associated with it; and one of the attributes determines whether a display object for the system object will be rendered in the top-level graphical user interface. This attribute can be set by the system automatically, or by a user through certain programs or system functionalities as described below. FIG. 6B shows an example of how the Notes object 2552 (not shown in FIG. 6A) is added to and the Web Video object 2516 is removed from the top graphical user interface of device 2500 (e.g. such as when the attributes of the Notes system object and the Web Video system object are modified).

Example Mobile Device Architecture

Figure 7:
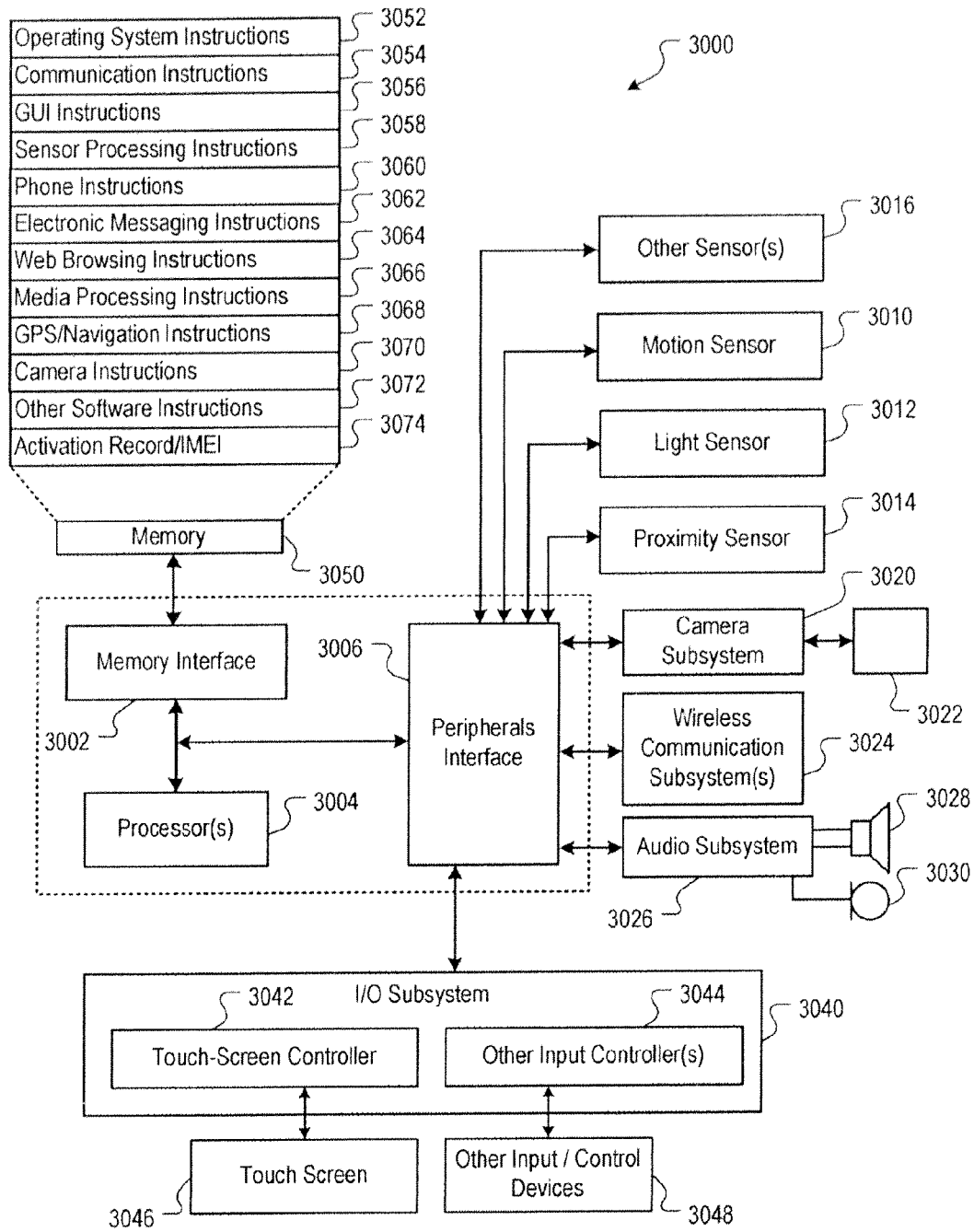
FIG. 7 is a block diagram illustrating an example implementation of the mobile device of FIG. 6A.

FIG. 7 is a block diagram 3000 of an example implementation of a mobile device (e.g., mobile device 2500). The mobile device can include a memory interface 3002, one or more data processors, image processors and/or central processing units 3004, and a peripherals interface 3006. The memory interface 3002, the one or more processors 3004 and/or the peripherals interface 3006 can be separate components or can be integrated in one or more integrated circuits. The various components in the mobile device can be coupled by one or more communication buses or signal lines.

Sensors, devices, and subsystems can be coupled to the peripherals interface 3006 to facilitate multiple functionalities. For example, a motion sensor 3010, a light sensor 3012, and a proximity sensor 3014 can be coupled to the, peripherals interface 3006 to facilitate the orientation, lighting, and proximity functions described with respect to FIG. 6A. Other sensors 3016 can also be connected to the peripherals interface 3006, such as a positioning system (e.g., GPS receiver), a temperature sensor, a biometric sensor, or other sensing device, to facilitate related functionalities.

A camera subsystem 3020 and an optical sensor 3022, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 3024, which can include radio frequency receivers and transmitters and/or optical (e.g., infrared) receivers and transmitters. The specific design and implementation of the communication subsystem 3024 can depend on the communication network(s) over which the mobile device is intended to operate. For example, a mobile device can include communication subsystems 3024 designed to operate over a GSM network, a GPRS network, an EDGE network, a Wi-Fi or WiMax network, and a Bluetooth™ network. In particular, the wireless communication subsystems 3024 may include hosting protocols such that the mobile device may be configured as a base station for other wireless devices.

An audio subsystem 3026 can be coupled to a speaker 3028 and a microphone 3030 to facilitate voice-enabled functions, such as voice recognition, voice replication, digital recording, and telephony functions.

The I/O subsystem 3040 can include a touch screen controller 3042 and/or other input controller(s) 3044. The touch-screen controller 3042 can be coupled to a touch screen 3046. The touch screen 3046 and touch screen controller 3042 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen 3046.

The other input controller(s) 3044 can be coupled to other input/control devices 3048, such as one or more buttons, rocker switches, thumb-wheel, infrared port, USB port, and/or a pointer device such as a stylus. The one or more buttons (not shown) can include an up/down button for volume control of the speaker 3028 and/or the microphone 3030.

In one implementation, a pressing of the button for a first duration may disengage a lock of the touch screen 3046; and a pressing of the button for a second duration that is longer than the first duration may turn power to the mobile device on or off. The user may be able to customize a functionality of one or more of the buttons. The touch screen 3046 can, for example, also be used to implement virtual or soft buttons and/or a keyboard.

In some implementations, the mobile device can present recorded audio and/or video files, such as MP3, AAC, and MPEG files, In some implementations, the mobile device can include the functionality of MP3 player, such as an iPod™. The mobile device may, therefore, include a 32-pin connector that is compatible with the iPod™. Other input/output and control devices can also be used.

The memory interface 3002 can be coupled to memory 3050, The memory 3050 can include high-speed random access memory and/or non-volatile memory, such as one or more magnetic disk storage devices, one or more optical storage devices, and/or flash memory (e.g., NAND, NOR). The memory 3050 can store an operating system 3052, such as Darwin, RTXC, LINUX, UNIX, OS X, WINDOWS, or an embedded operating system such as VxWorks. The operating system 3052 may include instructions for handling basic system services and for performing hardware dependent tasks. In some implementations, the operating system 3052 can be a kernel (e.g., UNIX kernel).

The memory 3050 may also store communication instructions 3054 to facilitate communicating with one or more additional devices, one or more computers and/or one or more servers. The memory 3050 may include graphical user interface instructions 3056 to facilitate graphic user interface processing; sensor processing instructions 3058 to facilitate sensor-related processing and functions; phone instructions 3060 to facilitate phone-related processes and functions; electronic messaging instructions 3062 to facilitate electronic-messaging related processes and functions; web browsing instructions 3064 to facilitate web browsing-related processes and functions; media processing instructions 3066 to facilitate media processing-related processes and functions; GPS/Navigation instructions 3068 to facilitate GPS and navigation-related processes and instructions; camera instructions 3070 to facilitate camera-related processes and functions; and/or other software instructions 3072 to facilitate other processes and functions, e.g., access control management functions. The memory 3050 may also store other software instructions (not shown), such as web video instructions to facilitate web video-related processes and functions; and/or web shopping instructions to facilitate web shopping-related processes and functions. In some implementations, the media processing instructions 3066 are divided into audio processing instructions and video processing instructions to facilitate audio processing-related processes and functions and video processing-related processes and functions, respectively. An activation record and International Mobile Equipment Identity (IMEI) 3074 or similar hardware identifier can also be stored in memory 3050.

Each of the above identified instructions and applications can correspond to a set of instructions for performing one or more functions described above. These instructions need not be implemented as separate software programs, procedures, or modules. The memory 3050 can include additional instructions or fewer instructions. Furthermore, various functions of the mobile device may be implemented in hardware and/or in software, including in one or more signal processing and/or application specific integrated circuits.

The disclosed and other embodiments and the functional operations described in this specification can be implemented in digital electronic circuitry, or in computer software, firmware, or hardware, including the structures disclosed in this specification and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal (e.g., a machine-generated electrical, optical, or electromagnetic signal), that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code).

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media and computer readable storage media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, the disclosed embodiments can be implemented on a computer having a display device, e.g., a CRT (cathode ray tube), LCD (liquid crystal display) monitor, touch sensitive device or display, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specifics, these should not be construed as limitations on the scope of what is being claimed or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understand as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Each of the processes, components, and algorithms described above may be embodied in, and fully automated by, code modules executed by one or more computers or computer processors. The code modules may be stored on any type of computer-readable medium or computer storage device. The processes and algorithms may also be implemented partially or wholly in application-specific circuitry. The results of the disclosed processes and process steps may be stored, persistently or otherwise, in any type of computer storage. In one embodiment, the code modules may advantageously be configured to execute on one or more processors. In addition, the code modules may include, but are not limited to, any of the following: software or hardware components such as software object-oriented software components, class components and task components, processes methods, functions, attributes, procedures, subroutines, segments of program code, drivers, firmware, microcode, circuitry, data, databases, data structures, tables, arrays, variables, or the like.

The various features and processes described above may be used independently of one another, or may be combined in various ways. All possible combinations and subcombinations are intended to fall within the scope of this disclosure. In addition, certain method or process steps may be omitted in some implementations.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions disclosed herein.

What is claimed is:

1. A computer-implemented method for processing graphics representations for display on a data processing system, the method comprising:
    generating a first set of graphics commands from a first client application executed by a central-processing unit (CPU), the first set of graphics commands in a first buffer that is associated with the first client application, the first set of graphics commands corresponding to a first image layer;
    generating, asynchronously to the generation of the first set of graphics commands, a second set of graphics commands from a second client application executed by the CPU, the second set of graphics commands-stored in a second buffer that is associated with the second client application, the second set of graphics commands corresponding to a second image layer;
    in response to detecting the generation of the second set of graphics commands, determining, by a compositing module executed by the CPU, whether composite processing is required to combine the first and second image layers as a composite image;
    generating one or more graphics compositing commands for the compositing processing to combine the first image layer and the second image layer, in response to the determining that the compositing processing is required to combine the first image layer and the second image layer, the composite image corresponding to graphics commands including the first set of graphics commands, the second set of graphics commands and the compositing graphics commands; and
    transmitting the first set of graphics commands, the second set of graphics commands, and the compositing graphics commands to a graphics queue to be processed by a GPU (Graphics Processing Unit) of a graphics system of the data processing system to display the composite image, wherein the GPU performs graphics processing operations based on the graphics queue in parallel with the compositing module generating the compositing graphics commands.

2. The method of claim 1, wherein the compositing graphics commands are generated via graphics API (Application Programming Interface) comprising at least one of OpenGL™, OpenGL™ ES, and DirectX™ APIs.

3. The method of claim 2, wherein the first and second client applications directly write via the graphics API the first and second sets of graphics commands to the first and second buffers, respectively.

4. The method of claim 3, wherein the first and second client applications write the respective graphics commands to the first and second buffers asynchronously.

5. The method of claim 3, wherein the first client application writes new graphics commands into a first portion of the first buffer, while graphics commands previously written into a second portion of the first buffer are processed by the GPU in parallel.

6. The method of claim 1, wherein the composite image corresponds to one frame of image data.

7. The method of claim 1, wherein the first set of graphics commands, the second set of graphics commands, and the compositing graphics commands are transmitted as a batch of graphics commands to the graphics queue in response to a notification indicating that the GPU is ready to process additional graphics commands.

8. The method of claim 1, wherein the first and second buffers are allocated from a pool of buffers.

9. The method of claim 1, wherein the first and second client applications call one or more graphics routines of the graphics API to send the first and second sets of graphics commands to the compositing module, which in turn stores the received the first and second sets of graphics commands in the first and second command buffers, respectively.

10. A non-transitory machine-readable medium having instructions stored therein, which when executed by a machine, cause the machine to perform a method for processing graphics representations for display on a data processing system, the method comprising:
    generating a first set of graphics commands from a first client application executed by a central-processing unit (CPU), the first set of graphics commands stored in a first buffer that is associated with the first client application, the first set of graphics commands corresponding to a first image layer;
    generating, asynchronously to the generation of the first set of graphics commands, a second set of graphics commands from a second client application executed by the CPU, the second set of graphics commands stored in a second buffer that is associated with the second client application, the second set of graphics commands corresponding to a second image layer;
    in response to detecting the generation of the second set of graphics commands, determining, by a compositing module executed by the CPU, whether composite processing is required to combine the first and second image layers as a composite image;
    generating one or more graphics compositing commands for the compositing processing to combine the first image layer and the second image layer, in response to the determining that the compositing processing is required to the first image layer and the second image layer, the composite image corresponding to graphics commands including the first set of graphics commands, the second set of graphics commands and the compositing graphics commands;
    in response to a ready signal indicating that the first and second sets of graphics commands and the compositing graphics commands are ready for execution, transmitting the first set of graphics commands, the second set of graphics commands, and the compositing graphics commands as a batch of graphics commands to a graphics queue to be processed by the GPU, wherein the GPU executes graphics commands based on the graphics queue in parallel with the compositing module generating the compositing graphics commands.

11. The non-transitory machine-readable medium of claim 10, wherein the compositing graphics commands are generated via graphics API (Application Programming Interface) comprises at least one of OpenGL™, OpenGL™ ES, and DirectX™ APIs.

12. The non-transitory machine-readable medium of claim 11, wherein the first and second client applications directly write via the graphics API the first and second sets of graphics commands to the first and second buffers, respectively.

13. The non-transitory machine-readable medium of claim 12, wherein the first and second client applications write the respective graphics commands to the first and second buffers asynchronously.

14. The non-transitory machine-readable medium of claim 10, wherein the composite image corresponds to one frame of image data.

15. The non-transitory machine-readable medium of claim 10, wherein the first set of graphics commands, the second set of graphics commands, and the compositing graphics commands are transmitted as a batch of graphics commands to the graphics queue in response to a notification indicating that the GPU is ready to process additional graphics commands.

16. The non-transitory machine-readable medium of claim 10, wherein the first and second buffers are allocated from a pool of buffers.

17. The non-transitory machine-readable medium of claim 12, wherein the first client application writes new graphics commands into a first portion of the first buffer, while graphics commands previously written into a second portion of the first buffer are processed by the GPU in parallel.

18. The non-transitory machine-readable medium of claim 10, wherein the first and second client applications call one or more graphics routines of the graphics API to send the first and second sets of graphics commands to the compositing module, which in turn stores the received the first and second sets of graphics commands in the first and second buffers, respectively.

19. A data processing system, comprising:
a central processing unit (CPU);
a graphics system having a graphics processing unit (GPU); and
a memory coupled to the CPU to store instructions, which when executed from the memory, cause the CPU to
generate a first set of graphics commands from a first client application executed by the CPU via a graphics application programming interface (API), the first set of graphics commands stored in a first buffer that is associated with the first client application, the first set of graphics commands corresponding to a first image layer,
generate, asynchronously to the generation of the first set of graphics commands, a second set of graphics commands from a second client application executed by the CPU via the graphics API, the second set of graphics commands stored in a second buffer that is associated with the second client application, the second set of graphics commands corresponding to a second image layer,
in response to detecting the generation of the second set of graphics commands, determine, by a compositing module executed in the memory by the CPU, whether composite processing is required to combine the first and the second image layers as a composite image,
generate one or more graphics compositing commands for the compositing processing to combine the first image layer and the second image layer, in response to the determining that the compositing processing is required to combine the first image layer and the second image layer, the composite image corresponding to graphics processing representations including the first set of graphics commands, the second set of graphics commands and the compositing graphics processing representations, and
transmit the first set of graphics commands, the second set of graphics commands, and the compositing graphics commands as a batch of graphics commands to a graphics queue to be processed by the GPU, wherein the GPU executes graphics commands based on the graphics queue in parallel with the compositing module generating the compositing graphics commands.

20. The system of claim 19, wherein the compositing graphics commands are generated via graphics API (Application Programming Interface) comprising at least one of OpenGL™, OpenGL™ ES, and DirectX™ APIs.

21. The system of claim 20, wherein the first and second client applications directly write via the graphics API the first and second sets of graphics commands to the first and second buffers, respectively.

22. The system of claim 21, wherein the first and second client applications write the respective graphics commands to the first and second buffers asynchronously.

23. The system of claim 21, wherein the first client application writes new graphics commands into a first portion of the first buffer, while graphics commands previously written into a second portion of the first buffer are processed by the GPU in parallel.

24. The system of claim 19, wherein the composite image corresponds to one frame of image data.

25. The system of claim 19, wherein the first set of graphics commands, the second set of graphics commands, and the compositing graphics commands are transmitted as a batch of graphics commands to the graphics queue in response to a notification indicating that the GPU is ready to process additional graphics commands.

26. The system of claim 19, wherein the first and second buffers are allocated from a pool of buffers.

27. The system of claim 19, wherein the first and second client applications call one or more graphics routines of the graphics API to send the first and second sets of graphics commands to the compositing module, which in turn stores the received the first and second sets of graphics commands in the first and second buffers, respectively.

28. A computer-implemented method for processing graphics representations for display on a data processing system, the method comprising:
generating a first set of graphics commands from a first client application executed by a central-processing unit (CPU), the first set of graphics commands stored in a first buffer that is associated with the first client application, the first set of graphics commands corresponding to a first image layer;
generating, asynchronously to the generation of the first set of graphics commands, a second set of graphics commands from a second client application executed by the CPU, the second set of graphics commands stored in a second buffer that is associated with the second client application, the second set of graphics commands corresponding to a second image layer;
in response to detecting the generation of the second set of graphics processing representations, determining, by a compositing module executed by the CPU, whether composite processing is required to combine the first and second image layers as a composite image;
generating one or more graphics compositing commands for the compositing processing to combine the first image layer and the second image layer, in response to the determining that the compositing processing is required to combine the first image layer and the second image layer, the composite image corresponding to graphics commands including the first set of graphics commands, the second set of graphics commands and the compositing graphics commands; and
performing graphics processing operations, by a graphics processing unit (GPU) of a graphics system of the data processing system, based on the first set of graphics commands, the second set of graphics commands, and the compositing graphics commands to display the composite image representing a combination of the first image layer, the second image layer, and an overlay layer having at least a portion of the first image layer and the second image layer, wherein the GPU executes graphics commands in parallel with the compositing module generating the compositing graphics commands.

29. The method of claim 28, wherein the first and second buffers are allocated from a pool of buffers.

30. The method of claim 28, wherein the first and second client applications directly write via graphics API (Application Programming Interface) the first and second sets of graphics commands to the first and second buffers, respectively.

31. The method of claim 30, wherein the first and second client applications write the respective graphics commands to the first and second buffers asynchronously.

32. The method of claim 30, wherein the first client application writes new graphics commands into a first portion of the first buffer, while graphics commands previously written into a second portion of the first buffer are processed by the GPU in parallel.

33. The method of claim 30, wherein the first and second client applications call one or more graphics routines of the graphics API to send the first and second sets of graphics commands to the compositing module, which in turn stores the received the first and second sets of graphics commands in the first and second buffers, respectively.

34. A non-transitory computer-readable medium having instructions stored therein, which when executed by a machine, cause the machine to perform a method for processing graphics commands for display on a data processing system, the method comprising:
  generating a first set of graphics commands from a first client application executed by a central-processing unit (CPU), the first set of graphics commands stored in a first buffer that is associated with the first client application, the first set of graphics commands corresponding to a first image layer;
  generating, asynchronously to the generation of the first set of graphics commands, a second set of graphics commands from a second client application executed by the CPU, the second set of graphics commands stored in a second buffer that is associated with the second client application, the second set of graphics commands corresponding to a second image layer;
  in response to detecting the generation of the second set of graphics commands, determining, by a compositing module executed by the CPU, whether composite processing is required to combine the first and second image layers as a composite image;
  generating one or more graphics compositing commands for the compositing processing to combine the first image layer and the second image layer, in response to the determining that the compositing processing is required to combine the first image layer and the second image layer, the composite image corresponding to graphics commands including the first set of graphics commands, the second set of graphics commands and the compositing graphics commands;
  performing graphics processing operations, by a graphics processing unit (GPU) of a graphics system of the data processing system, based on the first set of graphics commands, the second set of graphics commands, and the compositing graphics commands to display the composited image representing a combination of the first image layer, the second image layer, and an overlay layer having at least a portion of the first image layer and the second image layer, wherein the GPU executes the graphics commands in parallel with the compositing module generating the compositing graphics commands.

35. The non-transitory computer-readable medium of claim 34, wherein the first and second buffers are allocated from a pool of buffers.

36. The non-transitory computer-readable medium of claim 34, wherein the first and second client applications directly write via the graphics API the first and second sets of graphics commands to the first and second buffers, respectively.

37. The non-transitory computer-readable medium of claim 36, wherein the first and second client applications write the respective graphics commands to the first and second buffers asynchronously.

* * * * *